United States Patent [19]

Ichikawa

[11] Patent Number: 5,281,045

[45] Date of Patent: Jan. 25, 1994

[54] MOVABLE MEMBER POSITIONING MECHANISM

[75] Inventor: Yuichi Ichikawa, Tokyo, Japan

[73] Assignee: Asahi Kogaku Kogyo K.K., Tokyo, Japan

[21] Appl. No.: 887,817

[22] Filed: May 26, 1992

[30] Foreign Application Priority Data

May 29, 1991 [JP] Japan .................... 3-48385

[51] Int. Cl.[5] ................ F16B 1/00; G03B 17/00
[52] U.S. Cl. .................... 403/329; 403/330; 403/327; 403/325; 403/108
[58] Field of Search .......... 403/330, 327, 329, 325, 403/108; 354/266, 267.1, 288

[56] References Cited

U.S. PATENT DOCUMENTS

| | | | |
|---|---|---|---|
| 691,050 | 1/1902 | Dronne | 403/327 |
| 2,243,190 | 5/1941 | Capaldo | 403/378 |
| 4,436,269 | 3/1984 | Dirksing | 403/329 |
| 4,577,837 | 3/1986 | Berg et al. | 403/108 X |
| 4,864,340 | 9/1989 | Kaneko | 354/266 |
| 4,968,174 | 11/1990 | Krasznai | 403/330 X |
| 5,003,330 | 3/1991 | Kotani | 354/288 |

Primary Examiner—Randolph A. Reese
Assistant Examiner—Anthony Knight
Attorney, Agent, or Firm—Sughrue, Mion, Zinn Macpeak & Seas

[57] ABSTRACT

A movable member positioning mechanism in which the number of components of lock and click mechanisms is decreased, and the number of assembling steps is decreased accordingly. In the movable member positioning mechanism, a remote controller 20 is movably arranged along an inner wall 11 of a housing 10, a locking pawl (K) is arranged between the inner wall 11 and an outer wall 12, a lock hole 21 and a click hole 22 are formed in the surface of the remote controller 20 which is confronted with the inner wall 11, and the locking pawl (K) comprises: a lever 14 extended between the inner wall 11 and the outer wall 12; a locking portion 17 which is formed at one end of the lever 14 in such a manner as to be able to engage with the lock hole 21 and the click hole; an operating portion 16 which is formed at the other end of the lever 14 so as to cause the locking portion 17 to protrude towards the remote control 30 through the inner wall 11; and a spring member 18 for urging the locking portion 17 towards the lock hole 21 and the click hole 22.

6 Claims, 2 Drawing Sheets

MOVABLE MEMBER POSITIONING MECHANISM

BACKGROUND OF THE INVENTION

This invention relates to a mechanism for positioning a movable member which is arranged slidably with respect to a main body.

Heretofore, a positioning mechanism such as a locking mechanism or clicking mechanism for positioning a movable member which is slidable with respect to a main body has been made up of a number of independent components such as a locking pawl which engages with the movable member, a supporting mechanism for supporting the locking pawl, a spring for urging the locking pawl towards the movable member at all times, and an operating member for disengaging the locking pawl from the movable member by moving the locking pawl from the movable member.

That is, heretofore, in order to form a positioning mechanism such as a locking mechanism or clicking mechanism, it has been necessary to use a large number of components, and accordingly it has been rather troublesome to assemble the large number of components into the desired positioning mechanism.

SUMMARY OF THE INVENTION

In view of the foregoing, an object of this invention is to provide a movable member positioning mechanism, having fever components and which can be easily assembled and can be inexpensively manufactured as when compared to a conventional movable member positioning mechanism.

SUMMARY OF THE INVENTION

The foregoing object of the invention has been achieved by the provision of a movable member positioning mechanism comprising: a movable member, movably arranged along with a first wall of a main body, having a positioning recess in a surface which is confronted with the first wall; and a locking pawl arranged between the first wall and a second wall of the main body which is located opposite to where the movable member is located; the locking pawl comprising a base piece of a predetermined length which is extended between the first and second wall, the base piece including a fulcrum which is abutted against the first wall, a locking portion and an operating portion formed on both sides of said fulcrum in a longitudinal direction of the base piece, in such a manner that the locking portion is protrudable outside the first wall and engageable with the positioning recess of the movable member, and the operating portion being exposed outside the second wall and adapted to cause the locking portion to protrude outside the first wall, and the locking pawl further comprising a spring for urging the locking portion towards the recess of the movable member.

The present disclosure relates to subject matter contained in Japanese Utility Model Application No. Hei-3-48385 (filed on May 29, 1991) which is expressly incorporated herein by reference in entirety.

DESCRIPTION OF PREFERRED EMBODIMENT

One preferred embodiment of this invention will be described with reference to the accompanying drawings.

Figure 1:
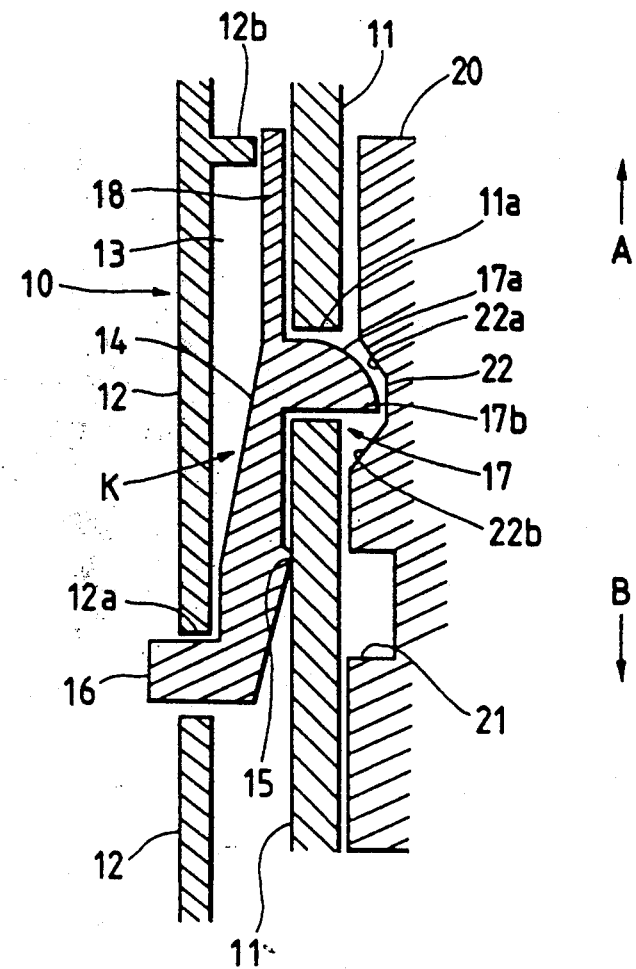
FIG. 1 is an explanatory diagram showing a remote controller click-locked to the housing of a camera employing a movable member positioning mechanism according to the invention.
Figure 4:
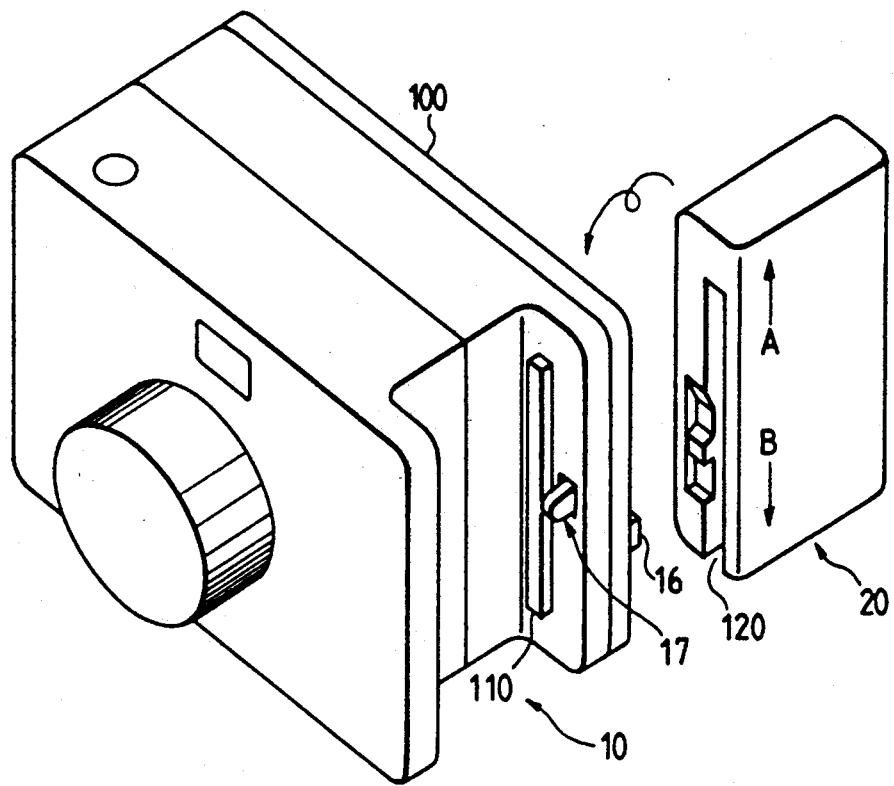
FIG. 4 is an explanatory diagram showing an overview of the remote controller and the camera.

As shown in FIG. 1, a housing 10, as a main body, includes an inner wall (first wall) 11 and an outer wall (second wall) 12, and a remote controller (movable member) 20 is detachably mounted on the housing 10. As shown in FIG. 4, a groove 120 of the remote controller is engaged with a slide rail 110 of the housing 10 so as to be slidable only in a direction along the slide rails 110. To attach the remote controller 20 to the housing 10 in FIG. 4, the remote controller 20 is first inverted from its orientation shown in FIG. 4 and is then inserted upwardly from the bottom of the housing in FIG. 4, such that the rail 110 and groove 120 are engaged. In order to detach the remote controller 20 from the housing 10, the remote controller 20 is slid until the slide rail 110 is disengaged from the slot 120.

A base piece, namely, a lever 14 is arranged in the space 13 defined by the inner wall 11 and the outer wall 12. The lever 14 has a fulcrum 15 at the middle as viewed longitudinally of it, which is in touch with, the inner wall 11.

One end portion of the lever 14, below the fulcrum 15, is formed into an operating portion 16 which is exposed outside the housing 10 through a through-hole 12a formed in the outer wall 12; while a portion of the lever 14 on the other side of the fulcrum 15 is formed into a locking portion 17 which is movable towards the remote controller 20 through a through-hole 11a formed in the inner wall 11. Spring means, namely, a spring member 18 is longitudinally extended from the other end portion of the lever 14. The spring member 18 is normally positioned along the inner wall 11.

The end portion of the spring member 18 held towards the inner wall 11 by a retaining piece 12b which is extended from the outer wall 12 towards the inner wall 11, such that the operating portion 16 normally extends out of the housing 10 through the through-hole 12a formed in the outer wall 12, while the locking portion 17 normally extends towards the remote controller 20 through the through-hole 11a formed in the inner wall 11.

As shown in FIG. 1, the locking portion 17 has a sloped surface 17a which is curved downwardly. In the embodiment, the lever 14, the fulcrum 15, the operating portion 16, the locking portion 17, and the spring member 18 form one unit, which is formed by using resin such as plastic. Also in this embodiment, the lever 14, the fulcrum 15, the operating portion 16, the locking portion 17, and the spring member 18 form a locking pawl (k).

On the other hand, a lock hole 21 substantially U-shaped in section (that is, a shape having a side wall perpendicular to the sliding direction A-B), and a click hole 22 substantially trapezoidal in section are formed in the inner surface of the remote controller 20 which is confronted with the inner wall. The lock hole 21 and the click hole 22 are positioning recesses which are engageable with the locking portion 17. The lock hole 21 is positioned below the click hole 22.

The operation of the movable member positioning mechanism thus constructed will now be described.

When the remote controller 20 is positioned with respect to the housing 10 as shown in FIG. 1, the locking portion 17 protruded towards the housing 10 through the through-hole 11a of the inner wall 11 is engaged with the click hole 22 of the remote controller 20.

The click hole 22 of the remote controller 20 has sloped surfaces 22a and 22b as shown in FIG. 1. Therefore, when, under this condition, the remote controller 20 is slid upwardly (or downwardly) as indicated by the arrow A (or B), the end 17b of the locking portion 17, being guided by the sloped surface 22b (or 22a) of the click hole 22, is pushed towards the outer wall 12, thus being retracted towards the outer wall 12 through the through-hole 11a of the inner wall 11 against the elastic force of the spring member 18. That is, the remote controller 20 is click-locked to the housing 10.

Figure 2:
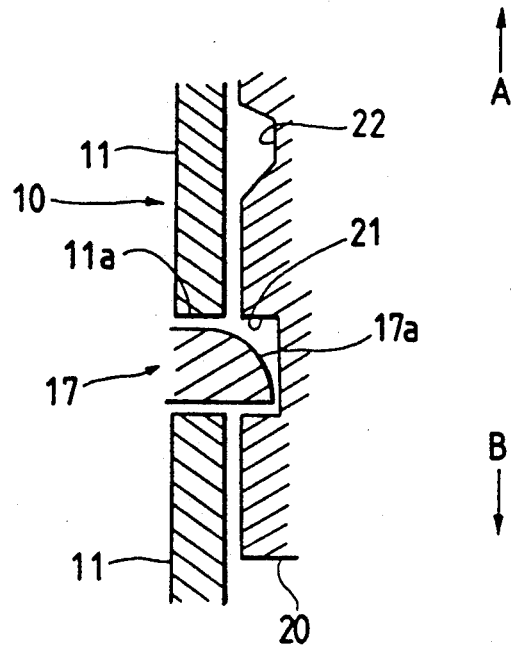
FIG. 2 is an explanatory diagram showing the remote controller locked to the housing of the camera.

When the remote controller 20 is positioned with respect to the housing 10 as shown in FIG. 2, the locking portion 17 protruded towards through the through-hole 11a of the inner wall 11 is engaged with the lock hole 21 of the remote controller 20.

As was described before, the lock hole 21 is substantially U-shaped in section (that is, a shape having a side wall perpendicular to the sliding direction A-B). Therefore, under the condition shown in FIG. 2, the locking portion 17 is held engaged with the lock hole 21, and the remote controller 20 cannot be slid upwardly; that is, the remote controller 20 is locked, in the direction of the arrow A, to the housing 20.

However, the remote controller 20 can be moved in the direction of the arrow B. That is, in this case, with the sloped surface 17a of the locking portion 17 abutted against the corner of the lock hole 21, the remote controller 20 is allowed to slide in the direction of the arrow B, while the locking portion is pushed towards the outer wall 12, thus being retracted towards the outer wall 12 through the through-hole 11a of the inner wall 11 against the elastic force of the spring member 18. Thus, the remote controller 20 is click-locked to the housing 10, but is slidable in the direction of the arrow B.

When it is required to slide the remote controller 20 in the direction of the arrow A which is held locked to the housing 10 as shown in FIG. 2, the operating portion 16 which has been protruded outside the housing 10 through the through-hole 12a of the outer wall 12 is depressed in order to detach the remote controller 20 from the housing 10 as shown in FIG. 2.

Figure 3:
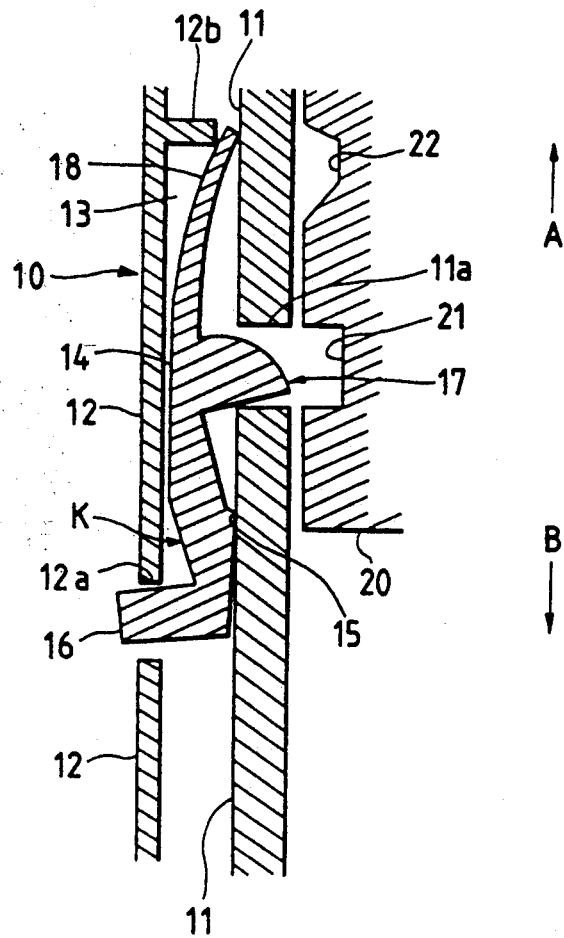
FIG. 3 is an explanatory diagram showing the remote controller unlocked from the housing of the camera.

As a result, the lever 14 is turned about the fulcrum 15 against the elastic force of the spring member 18, so that the locking portion 17 is retracted towards the outer wall 12 through the through-hole 11a of the inner wall 11 as shown in FIG. 3. Thus, the locking portion 17 s disengaged from the lock hole 21, and the remote controller 20 can be slid in the direction of the arrow A.

In the above-described embodiment, the spring member 18 is integral with the lever 14, the fulcrum 15, the operating portion 16, and the locking portion 17. In order to reinforce the mechanical strength of the spring member 18, it is preferable to form the spring member of a metal plate. That is, the spring member is formed of a metal separately, and the lever 14, the fulcrum 15, the operating portion 16 and the locking portion 17 are formed, as one component, of resin such as plastic. And the spring member of metal is connected to the component of resin by molding.

The positioning recesses formed in the remote controller 20 may be only lock holes or only click holes depending on the locking manner and locking position of the remote controller 20 with respect to the housing 10. The positioning recesses are optional both in number and in position.

While the invention has been described with reference to a camera, it should be noted that the technical concept of the invention is applicable to all articles with movable members. In the invention, the term "main body" is intended to mean an article or its part on which a movable member is slidably mounted.

As was described above, in an article having a movable member movably arranged on the first wall of the main body, the movable member positioning mechanism comprises a locking pawl arranged between the first wall and a second wall of the main body which is located on the side which is opposite to the side where the movable member is located, the movable member having the positioning recess, in the surface which is confronted with the first wall. According to the invention, the locking pawl comprises a base piece of a predetermined length which is extended between the first and second wall, and the base piece comprises: fulcrum which is abutted against the first wall, and the locking portion and the operating portion formed on both sides of the fulcrum in the longitudinal direction of the base piece, portion is protrudable outside the first wall and engageable with the positioning recess of the movable member, and the operating portion is exposed outside the second wall and adapted to cause the locking portion to protrude outside the first wall, and the locking pawl further comprises: spring means for urging the locking portion towards the recess of the movable member. Hence, the movable member positioning mechanism of the invention has relatively few components, and can therefore be easily assembled and can be inexpensively manufactured.

What is claimed is:

1. A movable member positioning mechanism comprising:
   a movable member, movably arranged along with a first wall of a main body, said movable member having a positioning recess in a surface which is confronted with said first wall; and
   a locking pawl arranged between said first wall and a second wall of said main body; said locking pawl comprising a base piece including a fulcrum which is abutted against said first wall, a locking portion and an operating portion formed on opposite sides of said fulcrum in a longitudinal direction of said base piece, in such a manner that said locking portion is protrudable outside said first wall and engageable with said positioning recess of said movable member, and said operating portion being exposed outside said second wall to permit said locking portion to protrude outside said first wall, and said locking pawl further comprising spring means for urging said locking portion towards said recess of said movable member, wherein said positioning recess is at least one of a lock hole substantially U-shaped in section, and a click hole substantially trapezoidal in section.

2. A movable member positioning mechanism as claimed in claim 1, wherein said locking portion of said base piece has a sloped curved surface so that when said locking portion is held engaged with said lock hole, said movable member is locked to prevent movement in one direction relative to said first wall while said movable member can be moved in another direction relative to said first wall.

3. A movable member positioning mechanism as claimed in claim 1, wherein said spring means is made of metal plate, and is connected to said base piece by resin molding.

4. A movable member positioning mechanism as claimed in claim 2, wherein said fulcrum, locking portion, operating portion and spring means are portions of a single integrally molded member comprising said locking pawl.

5. A movable member positioning mechanism comprising:

a movable member, movably arranged along with a first wall of a main body for sliding movement relative to said first wall in first and second opposite directions, said movable member having a positioning recess and a locking recess in a surface which is confronted with said first wall; and a locking pawl arranged between said first wall and a second wall of said main body; said locking pawl comprising a base piece including a fulcrum which is abutted against said first wall, a locking portion and an operating portion formed on opposite sides of said fulcrum in a longitudinal direction of said base piece, in such a manner that said locking portion is protrudable outside said first wall and engageable with said positioning recess of said movable member, and said operating portion being exposed outside said second wall to permit said locking portion to protrude outside said first wall, and said locking pawl further comprising spring means for urging said locking portion towards said recess of said movable member, wherein said positioning recess has a side surface which is not perpendicular to said first and second opposite directions of sliding movement of said movable member relative to said first wall for abutting against a first surface of said locking portion as said movable member slides in said first direction relative to said first wall, said locking recess having a side surface which is substantially perpendicular to said first and second directions of sliding movement for abutting against said first surface of the locking portion as said movable member slides in said first direction relative to said first wall, and said locking portion includes said first surface substantially parallel to said side surface of said locking recess and includes a second surface which is not perpendicular to said first and second directions of sliding movement, so that said movable member is slidable in said second direction relative to said first wall but is not slidable in said first direction relative to said first wall when said first surface of said locking portion engages said side surface of said locking recess.

6. A movable member positioning mechanism as claimed in claim 5, wherein said at least one side surface of said positioning recess is a surface closest to said locking recess.

* * * * *